Dec. 26, 1967  J. TRABEN  3,360,024
APPARATUS FOR DIVIDING LOGS INTO CHIPS
Original Filed Aug. 5, 1964  6 Sheets-Sheet 1

INVENTOR:
JOSEF TRABEN
BY
Browne, Schuyler & Beveridge
ATTORNEYS

INVENTOR.
JOSEF TRABEN
BY
Browne, Schuyler + Beveridge
ATTORNEYS

United States Patent Office 3,360,024
Patented Dec. 26, 1967

3,360,024
APPARATUS FOR DIVIDING LOGS
INTO CHIPS
Josef Traben, Oberkirch, Baden, Germany, assignor to Gebruder Linck, Baden, Germany, a corporation of Germany
Original application Aug. 5, 1964, Ser. No. 387,755. Divided and this application Jan. 23, 1967, Ser. No. 611,039
8 Claims. (Cl. 144—176)

This application is a division of my copending U.S. application Ser. No. 387,755 filed Aug. 5, 1964, entitled, Method for Dividing Logs Into Chips which in turn is a continuation-in-part of my earlier U.S. application Ser. No. 103,904 filed Apr. 18, 1961, and now abandoned.

This invention relates to apparatus for chipping the surfaces of logs and timbers so as to produce chips or flakes of excellent quality and admirably suited for making wood pulp, flake boards and particle boards. More specifically, the present invention relates to apparatus by which flat smooth surfaces can be cut on logs and timbers, but also provides for the production of an improved flake or chip highly desirable for the purposes mentioned above.

Accordingly, an important object of the present invention is to provide apparatus for cutting flat surfaces on logs while simultaneously converting the curved surface portions directly into flat chips of unbroken grain.

A further object of the present invention is to provide an improved apparatus for forming wood chips which is readily adjustable to produce chips of various thickness and size.

A further object of the present invention is to provide an improved apparatus for forming wood chips which can be readily adapted to be used either singly and in pairs or in combination with other wood working machines.

According to the present invention, there is provided a method for chipping logs or the like to produce flat chips including an apparatus which utilizes a rotating head having at least one scoring knife and an associated planing knife arranged from a center area of the head on conically widening helical paths. The scoring knife edges are positioned so that they will score the log passed in its longitudinal direction and across the axis of rotation of the chipping tool past the front face thereof and across the grain extending in said longitudinal direction while the planing knife edges are positioned so that they cut the desired chips out of the wood along at least one scored groove and across the grain.

The advantages of the present invention as well as the nature thereof will become more apparent from the following description and drawings wherein a preferred form of the invention is illustated.

Figure 8:
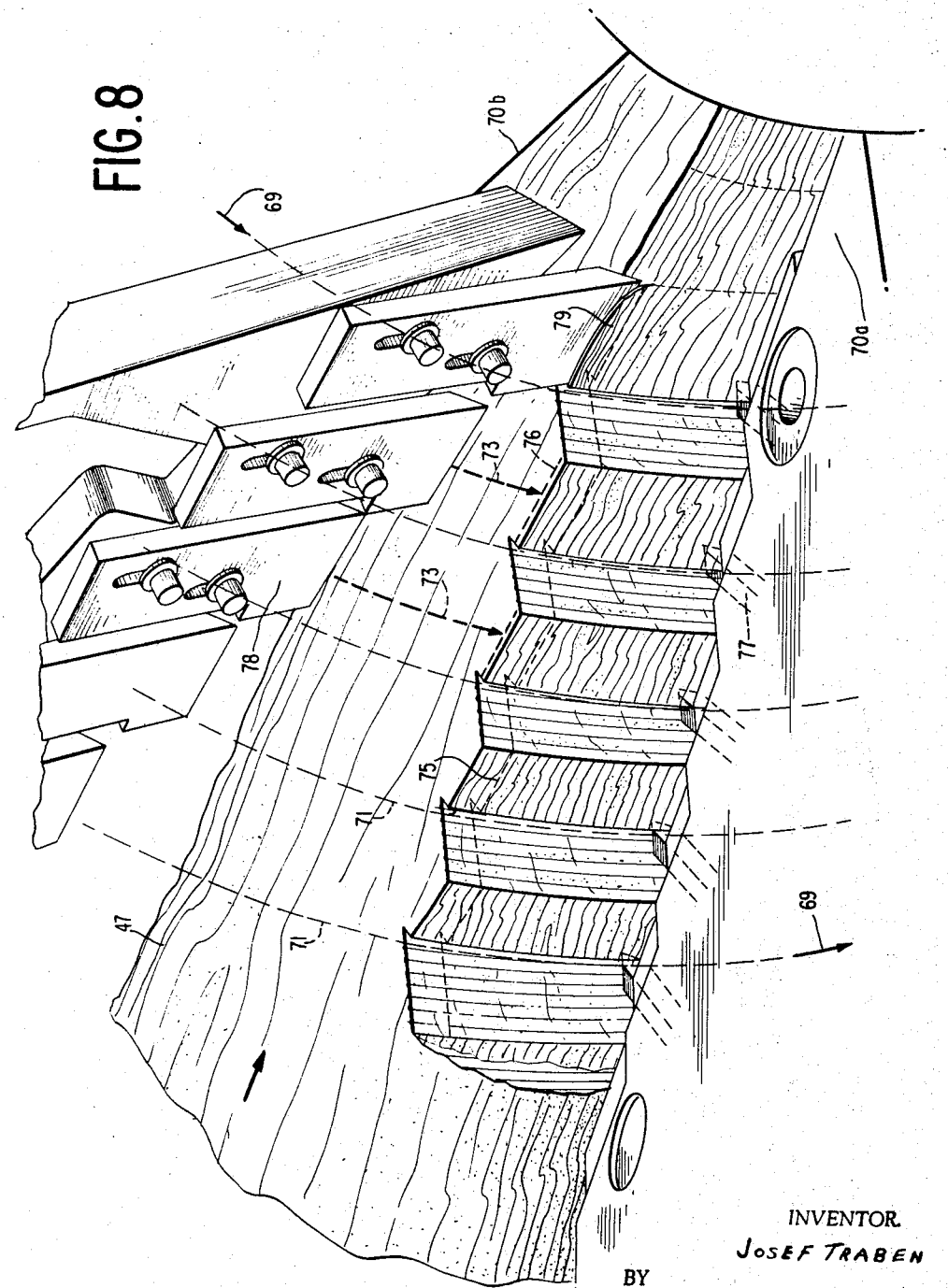
Figure 9:
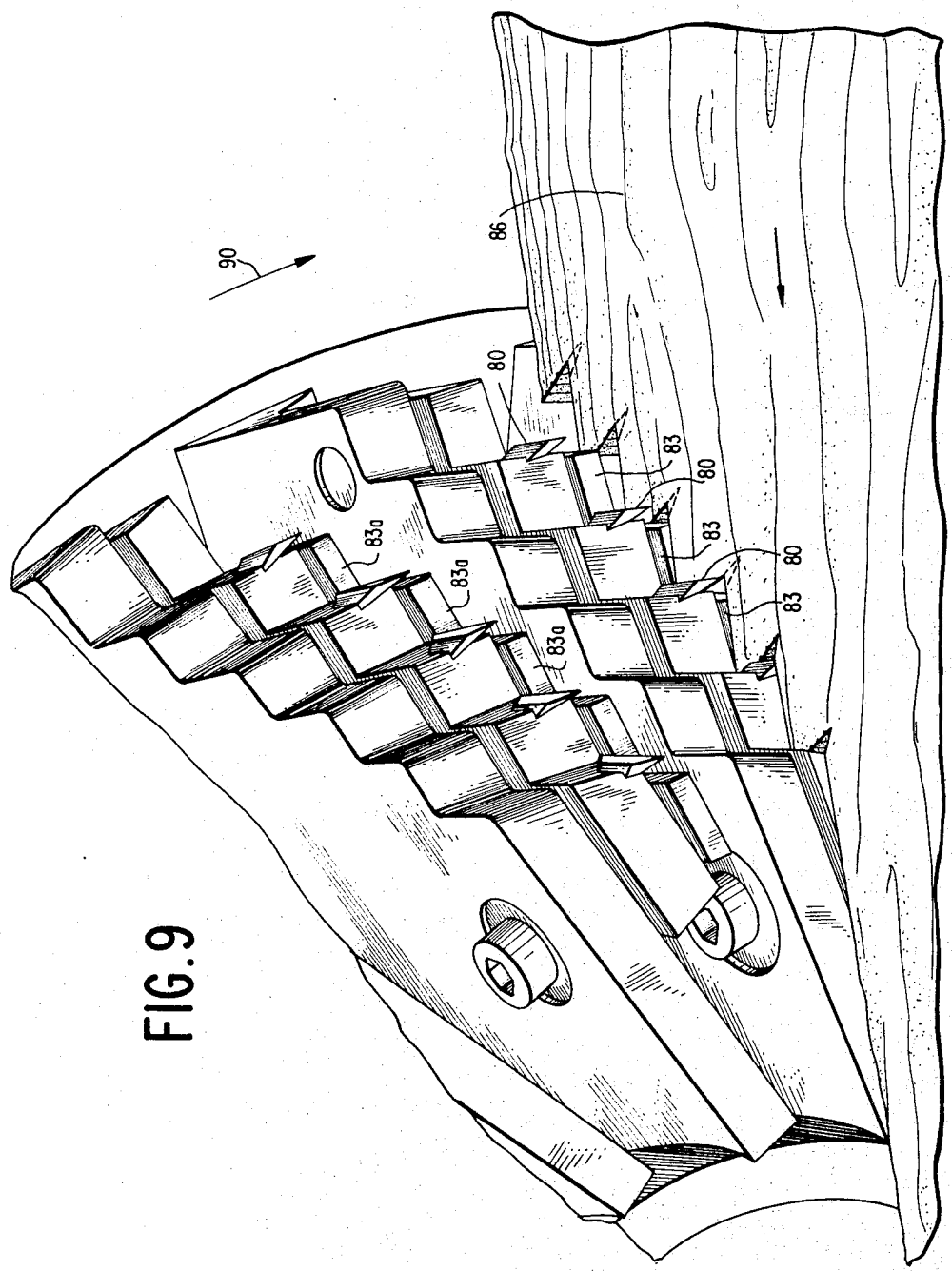

FIG. 8 is a perspective view as seen from within the chipping head, of a portion of a log, comprising scoring knife and planing knife sets on ribs of the chipping head, lines of the direction of rotation of the chipping head, of the scoring thrust and the planing thrust, and appearance of the chips before they are planed out or cut out; and FIG. 9 is a modified embodiment wherein the scoring knives and the planing knives are firmly combined into units.

The chipping head rotating about its center axis in a bearing (not shown), arranged in an exposed manner, and having the approximate shape of a frustum, which is denoted generally by 1, consists substantially of a thick disk 2 which serves as the base plate of the frustum and a plurality of stepped supporting ribs 3. The ribs are mounted firmly on disk 2, and begin at about the edge of the disk, and terminate at a hub-like ring 7 positioned centrally with respect to the axis of rotation of the head, the height of said ring being about equal to the height of the frustum. The ribs 3, disk 2 and hub-like ring 7 are integral, forming for instance a casting. Ring 7 is reinforced inwardly by webs 8, which terminate at a flange 10 at the bottom of said ring. With the aid of set bolts 11, the flange 10, ring 7, and ribs 3 are firmly connected detachably to a outerflange (not shown) of the supporting drive shaft (also not shown) of a drive motor (not shown).

All of plate-shaped ribs 3 are spaced evenly and positioned symmetrically so that they are tangent to an imaginary ring located within ring 7. In addition, they are stepped from ring 7 towards disk 2 approximately along the shell of said frustum, and increase in thickness from their free longitudinal or front edges to their bases terminating at disk 2. The stepping is provided in order for the mounting plates 13 mounted on ribs 3 and provided with said scoring knives and said planing knives, to have maximum seat and support. These plates are attached to said ribs, for instance, by means of screws 17 and 18.

Figure 1:
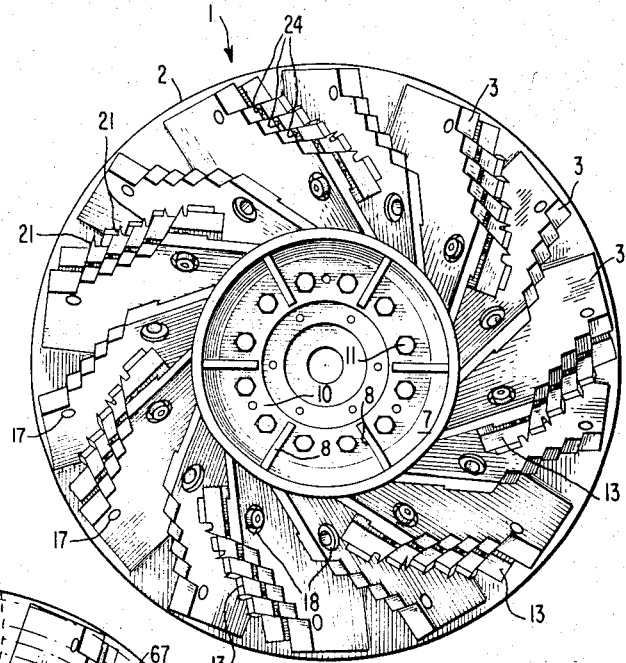
FIG. 1 is a front view of the chipping tool of the present invention.
Figure 3:
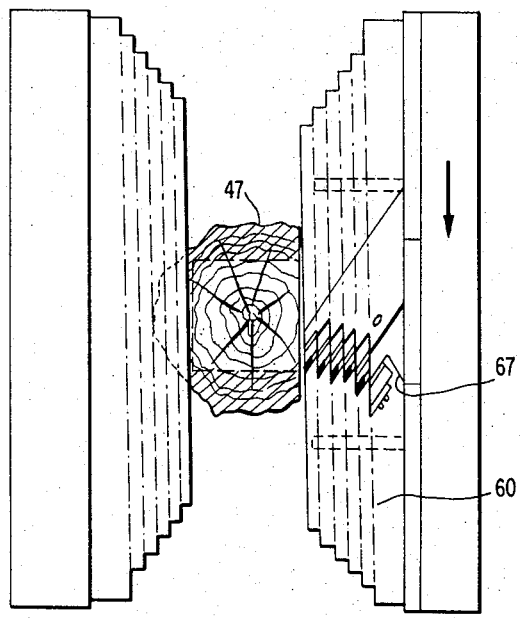
FIG. 3 is a schematic view of the contemplated mounting of two opposite chipping heads for an increased capacity of operation.
Figure 4:
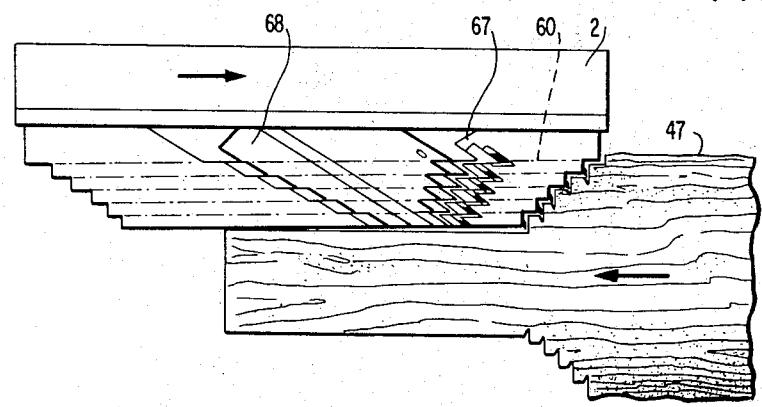
FIG. 4 is a schematic top view of the chipping tool and the front portion of a log as engaged by the chipping tool.

As shown in FIGS. 1, 3, 4, mounting plates 13 carry scoring knives 21 and planing knives 24. The mounting plate 13 (FIG. 5) has a longitudinal groove 27 to a accommodate a screw bolt (not shown) for detachably and adjustably securing said plate to the associated rib 3 of the chipping head. Further, the plate 13 has recesses 28 and 29 which reduce the weight as desired virtually without affecting the strength. The plate 13 is angled between the two recesses, the edge of the leg beginning at groove 27 is disposed approximately in parallel with the surface of ring 7, the edge of the other leg approximately in parallel with disk 2. The third edge follows the cone surface and is stepped similar to ribs 3. Further, the plate 13 has grooves 30 to receive scoring knives 21. Scoring knife 21 is detachably secured to plate 13 by means of screws 31.

Figure 5:
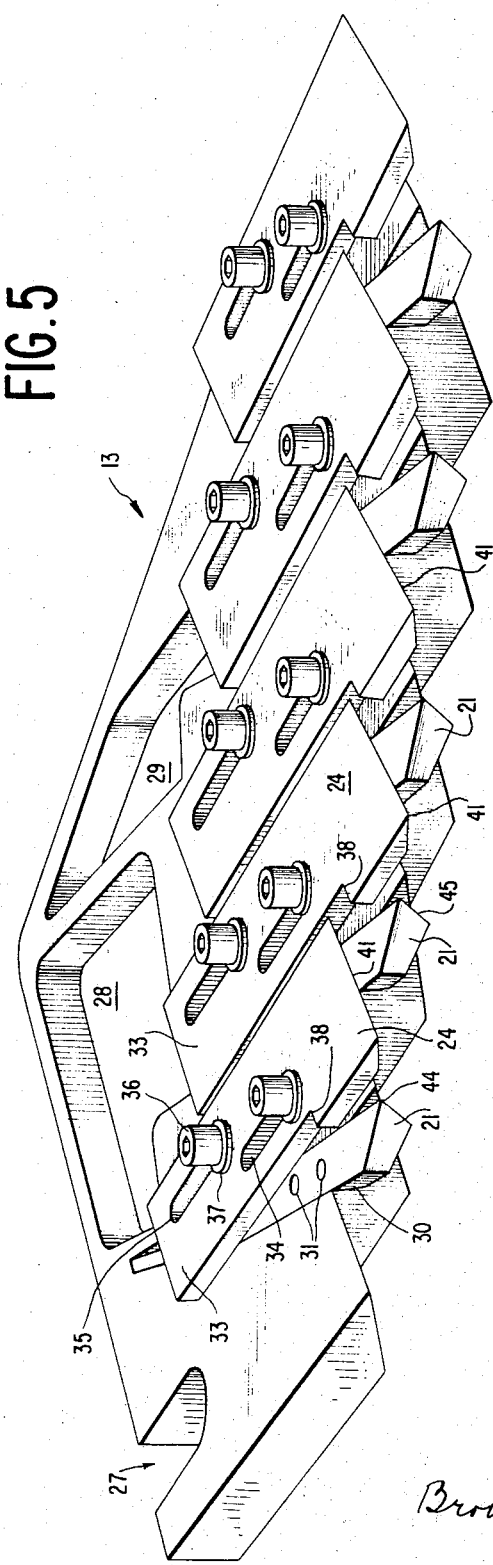
FIG. 5 is a perspective view of a group of scoring knives and a group of planing knives which are attached to a mounting plate.

The scoring knife 21 is secured further by means of the plate-shaped trunk 33 of planing knife 24, the trunk partly overlapping the knife. The trunk has two slot grooves 34, 35, through which bolts are passed, which are threaded and partly screwed into plate 13 and partly carry a nut 36 which is tightened against trunk 33 through a washer 37. Each trunk has a shoulder such as 38 with an enlarged portion that terminates at the front in a planing knife such as 24. The adjacent planing knife is adapted to engage the trunk recess beginning with the shoulder. For instance, planing knife 24 and part of its trunk 33 engage recess 38 in adjacent trunk 33 having planing knife 24 (FIG. 5).

As shown in FIGS. 1, 2, 3, 7, and 8, the edges of planing knives 24 are disposed in parallel with each other and with mounting plate 13 and its mounting rib 3 in the chipping head. Likewise, the cutting edges of scoring knives 21 are disposed approximately in parallel with each other in the projection toward the center plane of each planing knife, but about normal to the planing knife edge. Further, the scoring knife 21 is positioned so that the wood is engaged a little behind the tip, i.e. by the edge 45, rather than by the tip 44 of the scoring knife.

Figure 6:
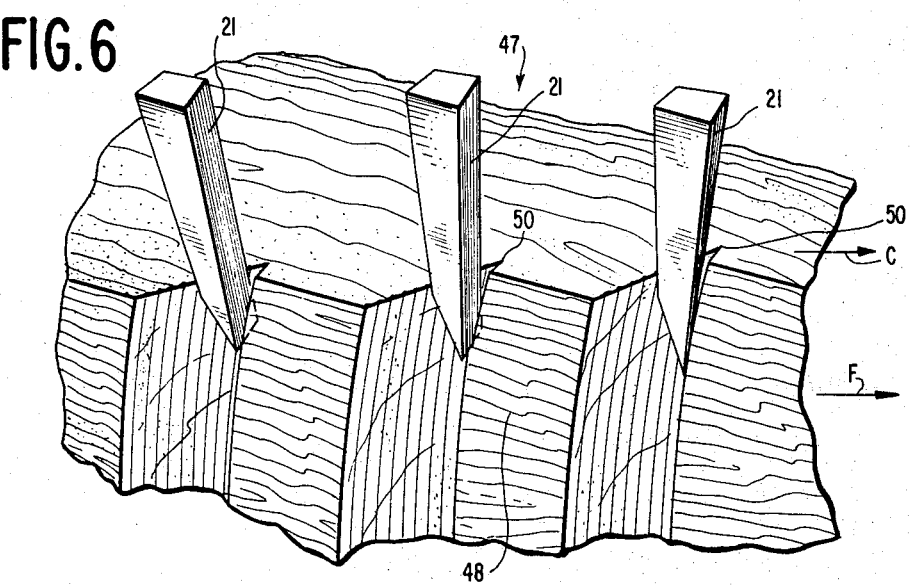
FIG. 6 is a schematic perspective view of three scoring knives alone as they cut into a log diagonally or angularly.

Each two adjacent scoring knives determine the width of a chip cut out by a planing knife subsequently arranged in the direction of rotation of the chipping head. Reference in this respect should be had to FIGS. 6 and 7. FIG. 6 shows how three scoring knives 21 diagonally cut into the wood of the log generally denoted 47, across the longitudinal direction F of the grain with scoring grooves 50 being made. These grooves are made irrespective of the fact that log 47 travels in its longitudinal direction C against the side of the chipping head and past said head. The rotational speed of the head is such that the log may be considered as standing relatively still as the scoring knives and the planing knives perform their cutting operation.

Figure 7:
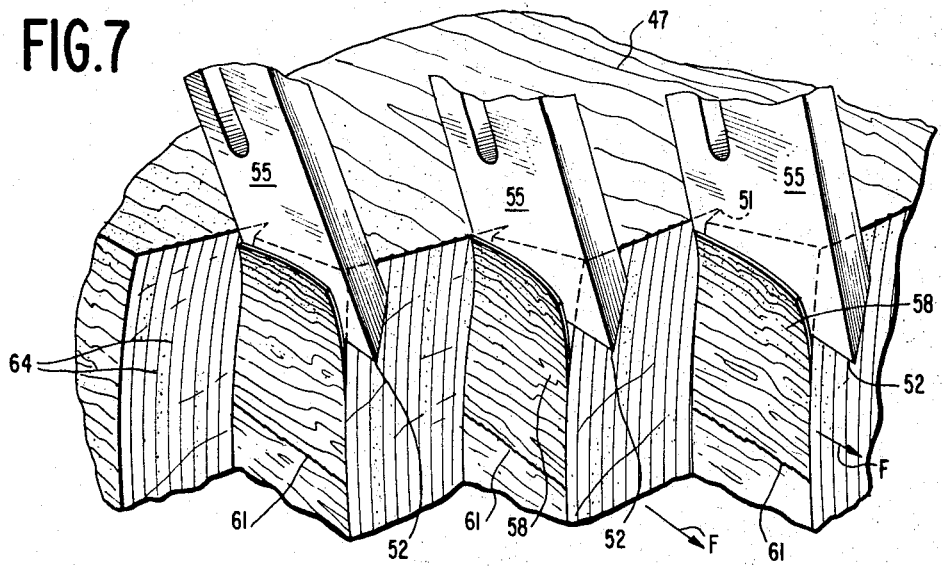
FIG. 7 is a perspective view of three planing knives alone as they engage a log diagonally or angularly at points scored by the scoring knives.

FIG. 7 shows the engagement of the planing knife. Edges 52 of planing knives 55 peripherally following scoring knives 21, engage the wood successively at least along one scoring groove, but in parallel with the longitudinal grain direction F thereof. In this engagement, chips 58 are being put out, which theoretically are to have the entire length of the planed log side, but in actual fact are broken off to be shorter because of the overturn at any desired wood grain. In a slot, curved lines, caused by scoring and planing blows, mark the single 360° revolution of the particular row of planing knives in the chipping head.

FIG. 8 is a schematic and perspective view of a log 47 which has been given a tapered step shape extending to the right due to the engagement of the knives. Rib 70a is disposed peripherally in direction of rotation 69 ahead of rib 70b.

The knives on preceding rib 70a engage log 47 on thinly drawn circular paths 71 which constitute the revolution of the chipping head. The grains of the following rib 70b include thickly drawn out circular paths 73. Thin line 75 represents the line of scoring impact; each thick line 76, the line of planing impact. By line of impact is meant the line along which the particular knife, scoring or planing, will engage the log diagonally. The scoring knives of the preceding rib 70a are referred to by 77, the associated planing knives of the following rib 70b, by 78. By their engagement, these knives associated with one another form the desired chip, e.g. 79.

FIG. 9 shows a modified form wherein scoring knives 80 are mounted firmly above planing knives 83 and are integral within the mounting plate. The scoring knives 80 are in turn mounted firmly to planing knives 83, e.g. made to be integral therewith. Each five scoring knives of a preceding chipping head rib, score the wood or cut into it across its direction of grain also in this embodiment, and the desired plate-shaped chip having an undamaged grain is cut out of the wood such as a log, pole, timber, beam, or the like, by the associated planing knife disposed on the following rib next in line, as said planing knife engages the wood in parallel with the grain direction. The bottom part of the figure shows several scoring knives 80 during and prior to their engagement of body of wood 86. The next group of knives 83a are shown following relative to the chipping tool direction of rotation 90.

From the foregoing description, the operation of the novel chipping apparatus of the present invention will be evident. The previously debarked log 47 will be introduced into the chipping tool in the direction of the arrow as shown in FIG. 2.

Accordingly, it will be apparent that the engagement of the scoring knives, preferably normal to the longitudinal grain direction; and the engagement of the planing knives, preferably in parallel with the longitudinal grain direction, will depend upon the fact that the log is not too thick in relation to the diameter of the chipping head and that the log always passes in the center of the head. The larger the diameter of the head is, the smaller the diameter of the log is; and the closer the log passes the head horizontally where the knives engage vertically, the more ideally will the requirements be met of "normal" to and in "parallel" with the grain direction. However, it has been found with the present invention that the range of tolerances regarding the diameter relations and the level of passage of the log are relatively broad such that flat plate-shaped or disk-shaped chips having an undamaged longitudinal grain are produced throughout this range.

Figure 2:
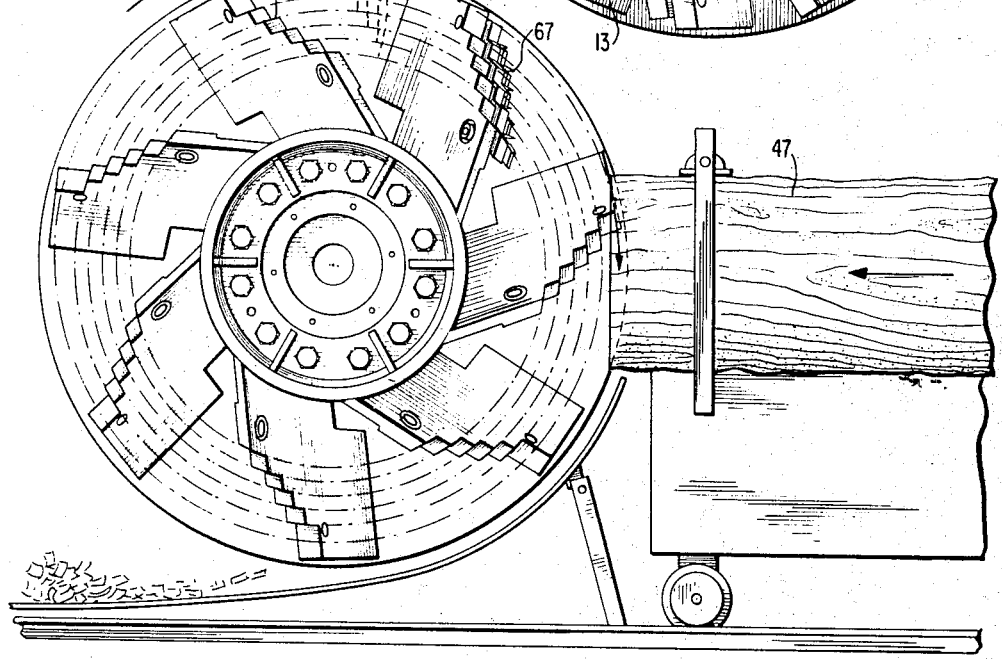
FIG. 2 is a schematic view of the chipping tool from the front side as normally employed for chipping a log.

As shown especially by FIGS. 2, 3, and 4, the scoring knives and the planing knives for one thing are disposed in the direction of the imaginary surface of the cone head, or in other words in a radial tangential direction along the ribs 3 from within ring 7 outwardly of disk 2 from a knife 67 to the peripherally following knife 68 so that the scoring knives or planing knives arranged in correspondence with one another are located successively in helical paths. According to FIG. 2, this is one coherent multiple path 66. Since they are stationary on the chipping tool, the revolution in space of the scoring knives and the planing knives themselves is, of course, in circular paths. But in looking against the front face of the running chipping head, continuously running spirals are perceived.

It will be further noted that the scoring knives and the planing knives are set back axially from one group to the group peripherally following in the direction of rotation, and are slightly staggered laterally in effecting the spiral path, whereby a natural overlapping into the traveling log results after one revolution of the head.

With respect to FIG. 1, it should be noted that in the chipping tool illustrated there, only every other rib 3 is mounted with scoring knives and planing knives, but it is readily possible for each rib to be mounted. Of course, the mounting always must be symmetrical with respect to rotation, for example, the first and eight ribs; the first, third, fifth seventh ninth, eleventh and thirteenth ribs; and the like.

Various modifications can be made in the chipping device of the present invention. Thus the ribs 3 can be wedge-shaped so that the base thereof connected to the disk 2 is broader than the upper portion of the ribs. In addition, the scoring knives and the planing knives may be mounted either directly to the ribs or to special plates which in turn are mounted to the ridges. The great advantage of the latter embodiment is that together with the plates, the knives can be assembled to form construction units which are rapidly exchanged for e.g. repair purposes or for selecting different scoring knives and/or planing knives, for instance, for logs having a different diameter or constituting a different kind of wood.

While the illustrative embodiments of the invention have been described hereinbefore with particularity, it will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art to which the invention pertains.

What I claim is:

1. In a wood chipping device a rotating chipping head having a work engaging front face arranged for engaging the curved sides of a log to be cut, a plurality of stepped equally spaced ribs mounted on said front face and at least one set of two scoring knives in association with one planing knife mounted on each of at least two or said ribs, said two scoring knives disposed in parallel arrangement so as to engage first the log and define the width of the cut made by the planing knife which follows and engages the log in a direction parallel with the grain thereof.

2. The wood chipping device of claim 1 in which a hub-like ring is positioned in the center of the front face, said ribs spaced so that the ribs are tangent to an imaginary ring located within said hub-like ring.

3. The wood chipping device of claim 1 in which the scoring knives and planing knives are arranged in stepped alignment with said ribs.

4. A wood chipping device having a rotary head adapted to be rotated into engagement with a side of a log about an axis generally normal to the longitudinal axis of the log, first means on said head for scoring the log generally across the grain along at least two spaced paths, and second means for cutting generally along the grain of the log between said scored paths to remove a chip from the log.

5. The device defined in claim 4 further having one side adapted to face the log to be chipped and said scoring and cutting means are positioned on said one side.

6. The device defined in claim 5 wherein said head has a number of ribs radiating and receding from a center portion thereof and also being partly tangentially oriented with respect to an imaginary circle drawn in the head, said first means being located at a first station along one of the ribs and said second means being located at a second station along said one rib and spaced outwardly from said first station whereby the log to be chipped is first scored by said first means and then cut by said second means.

7. The device defined in claim 6 wherein said head further has a number of mounting plates attached respectively to said ribs, and said first and second means are on said mounting plates.

8. The device defined in claim 7 wherein said first and second means are integral with said mounting plates.

References Cited

UNITED STATES PATENTS

| | | | |
|---|---|---|---|
| 200,540 | 2/1878 | Jeffers. | |
| 3,017,912 | 1/1962 | Sybertz | 144—42 X |
| 3,240,245 | 3/1966 | Johnson | 144—176 |
| 3,250,305 | 5/1966 | Dunbar | 144—326 X |

WILLIAM W. DYER, Jr., *Primary Examiner.*

W. D. BRAY, *Assistant Examiner.*